(12) United States Patent
Kanao

(10) Patent No.: US 7,156,128 B1
(45) Date of Patent: Jan. 2, 2007

(54) SYNTHETIC RESIN PIPE

(75) Inventor: Shigeki Kanao, Nishinomiya (JP)

(73) Assignee: Kanaflex Corporation, Osaka (JP)

( * ) Notice: Subject to any disclaimer, the term of this patent is extended or adjusted under 35 U.S.C. 154(b) by 0 days.

(21) Appl. No.: 11/253,744

(22) Filed: Oct. 20, 2005

(51) Int. Cl.
*F16L 11/00* (2006.01)

(52) U.S. Cl. ............... 138/133; 138/122; 138/143; 138/144

(58) Field of Classification Search ............ 138/122, 138/133, 129, 143, 144
See application file for complete search history.

(56) References Cited

U.S. PATENT DOCUMENTS

| | | | | | |
|---|---|---|---|---|---|
| 2,132,189 | A | * | 10/1938 | Roemer | 138/136 |
| 4,303,104 | A | * | 12/1981 | Hegler et al. | 138/121 |
| 4,487,232 | A | * | 12/1984 | Kanao | 138/122 |
| 4,862,924 | A | * | 9/1989 | Kanao | 138/144 |
| 5,007,462 | A | * | 4/1991 | Kanao | 138/154 |
| 5,109,889 | A | * | 5/1992 | Kanao | 138/173 |
| 5,191,916 | A | * | 3/1993 | Kanao | 138/173 |
| 5,193,588 | A | * | 3/1993 | Kanao | 138/133 |
| 5,284,185 | A | * | 2/1994 | Kanao | 138/122 |
| 5,316,047 | A | * | 5/1994 | Kanao | 138/173 |
| 5,385,174 | A | * | 1/1995 | Kanao | 138/122 |
| 5,390,704 | A | * | 2/1995 | Kanao | 138/121 |
| 5,573,038 | A | * | 11/1996 | Kanao | 138/122 |

* cited by examiner

*Primary Examiner*—James Hook
(74) *Attorney, Agent, or Firm*—Wenderoth, Lind & Ponack, L.L.P.

(57) ABSTRACT

An object of the present invention is to provide a synthetic resin pipe configured to perform water stop accurately by forming a part connecting convex portions of an outer pipe to be flat without reducing flexibility in order to compose a synthetic resin pipe having flat inner and outer surfaces. A synthetic resin pipe according to the present invention includes an inner pipe formed by spirally winding a belt-like synthetic resin; a spiral reinforcing part formed by spirally winding a synthetic resin having a projected rim with convex portions projecting outside; an outer pipe of belt-like synthetic resin provided so as to connect a part or all of the convex portions arranged in a pipe axis direction; and a shape retaining material for the outer pipe made of a belt-like metal sheet for retaining a shape of the outer pipe flat and buried in or provide to an inner surface of the outer pipe; wherein the shape retaining material for the outer pipe is a synthetic resin pipe wound around the convex portions of the projected rim at predetermined intervals and connecting the convex portions of the projected rim.

9 Claims, 18 Drawing Sheets

SYNTHETIC RESIN PIPE

BACKGROUND OF THE INVENTION

1. Field of the Invention

The present invention relates to a synthetic resin pipe which is mainly used in the underground. More particularly, the present invention relates to a synthetic resin pipe, in which an inner surface and an outer surface are flat and smooth, used for leading communication cables or power transmission wires, or used as a water pipe for water and sewerage.

2. Description of the Related Art

Synthetic resin corrugated pipes are conventionally used. In a synthetic resin corrugated pipe, an inner surface is formed flat and smooth and an outer surface includes projecting parts and depression parts alternately in the pipe axis direction to withstand strong pressures from inside or outside.

This type of corrugated pipe has concave portions and convex portions on the outer surface and a resistance for pulling the pipe in is large so that a smooth working process may not be obtained. Further, in order to connect this type of pipes to each other, a particular joint structure is required to fill gaps of the concave portions to keep out water.

For this situation, a synthetic resin pipe is disclosed, in which an outer pipe is composed of a belt-like synthetic resin rolled to bridge convex portions so that the outer surface is approximately flat and smooth (See Japanese Patent Laid-Open Publication No. H8-258177, for example).

According to this type of synthetic resin pipe, the outer surface is formed approximately flat so that the pulling resistance becomes dramatically small and the workability is improved. Further, water-stop performance at a connecting part can be improved compared to the conventional corrugated pipes.

SUMMARY OF THE INVENTION

However, the above conventional synthetic resin pipe cannot prevent a deformation of the portion connecting the convex portion in outer pipe into a curved shape resulting from its shrinkage in the pipe axis direction caused when the synthetic resin pipe is hardened. When the curving degree becomes large, an object to form a flat outer surface in synthetic resin pipe cannot be achieved.

The outer pipe may be formed thicker to prevent the deformation of the outer pipe, however, it may increase the weight of the synthetic resin pipe and decrease the flexibility of the synthetic resin pipe.

The present invention is obtained by considering the above described problems of the conventional synthetic resin pipes, and to provide a synthetic resin pipe in which water-stop is performed correctly by preventing the reduction of the flexibility and preventing the deformation of the portion bridging the convex portions in outer pipe in order to provide a structure of a synthetic resin pipe having flat inner and outer surfaces.

A synthetic resin pipe according to the present invention includes an inner pipe formed by spirally winding a belt-like synthetic resin, a spiral reinforcing part formed by spirally winding a synthetic resin having a projected rim with convex portions projecting outside, an outer pipe of belt-like synthetic resin provided so as to connect a part or all of the convex portions arranged in a pipe axis direction, and a shape retaining material for the outer pipe made of a belt-like metal sheet for retaining a shape of the outer pipe flat and buried in or provide to an inner surface of the outer pipe. The shape retaining material for the outer pipe is a synthetic resin pipe wound around the convex portions of the projected rim at predetermined intervals and connecting the convex portions of the projected rim.

According to the present invention, the shape retaining material for the outer pipe arranged to straddle the projected rim can withstand an external pressure not to deform the shape of the outer surface when an external pressure is operated to the synthetic resin pipe to maintain the outer pike flat. Further, since a predetermined interval is provided, the flexibility of the synthetic resin pipe is maintained.

In the present invention, the outer pipe, which is retained to be flat by the shape retaining material for the outer pipe, may be provided to only both ends of the inner pipe around which the spiral reinforcing part is wound. Accordingly, when synthetic resin pipes are connected to each other, the outer surface of the pipe end as a connecting portion is kept flat so that connecting operation becomes easier and water-stop performance is improved. Since the synthetic resin pipe other than the connecting portions is provided only with the inner pipe having the spiral reinforcing part, the weight can be reduced. That is, pressure-proof flatness strength in a particular part can be improved while an increase of the weight of the synthetic resin pipe is suppressed.

In the present invention, a reinforcing material made of metal sheet is provided to the spiral reinforcing part along the projected rim, thereby pressure-proof flatness strength of the synthetic resin pipe can be further improved.

In the present invention, by forming a step portion for positioning an end in the pipe axis direction of the shape retaining material for the outer pipe to the top portion of the projected rim, the shape retaining material for the outer pipe can be positioned correctly to the top portion of the projected rim, and flatness of the outer surface of the synthetic resin pipe can be more improved.

In the present invention, a shape retaining material for the inner pipe of a metal sheet for retaining the flatness of the inner pipe may be buried in the inner pipe correspondingly to the above reinforcing material. Thereby, an external pressure operating to the synthetic resin pipe can be received by the shape retaining material for the outer pipe, the reinforcing material of the spiral reinforcing part, and the shape retaining material for the inner pipe so that the pressure-proof flatness strength can be improved to the maximum.

In the present invention, when the reinforcing material includes a pair of leg parts in the inner circumference, it is preferable that the shape retaining material for the inner pipe is arranged to connect those leg parts in the pipe axis direction.

In the present invention, when the reinforcing material includes a pair of leg parts in the inner circumference, the spiral reinforcing part and the inner pipe are simultaneously reinforced with a reinforcing material by bending one of the leg parts toward the pipe axis direction and extending toward an adjacent projected rim along an outer body wall of the inner pipe.

In the present invention, the predetermined interval provided to the shape retaining material for the outer pipe may form a fusing portion of the outer pipe and the spiral reinforcing part.

In the present invention, synthetic resin materials such as polyethylene, polyvinyl chloride, polypropylene, or other synthetic resin materials can be used as materials of each synthetic resin for composing the synthetic resin pipe.

A metal reinforcing belt-like plate made of an iron sheet and a stainless steel plate, which is cut in a belt-like shape and is from 0.2 mm to 2.0 mm thick, or a processed sheet of the above metal reinforcing belt-like plate can be used as the shape retaining material for the outer pipe, the shape retaining material for the inner pipe and the reinforcing material of the spiral reinforcing part.

When the same synthetic resin coated materials are used for the shape retaining material for the outer pipe, the shape retaining material for the inner pipe and the reinforcing material, fusion for the outer pipe and the spiral reinforcing part and for the spiral reinforcing part and the inner pipe are respectively improved by heating and fusing the synthetic resin coated layer.

Further, in the present invention, a spiral reinforcing part and a projected rim in reinforcing material for reinforcing the spiral reinforcing part may be formed in square curved waves of a rectangular shape, a square shape, a trapezoidal shape, or a triangular shape; or circular curved waves of a semicircular shape.

According to the synthetic resin pipe of the present invention, it is possible to improve the water-stop performance because the outer pipe is retained flat, and in addition, the pipes may be connected to each other without troublesome connecting work. It is further possible to improve, without sacrificing the flexibility, the pressure-proof flatness strength resisting against the external pressure applied to the synthetic resin pipe.

DESCRIPTION OF THE PREFERRED EMBODIMENTS

The present invention will be described in detail based on the following embodiments with reference to the drawings.

a. Synthetic Resin Pipe Having Outer Pipe with Shape Retaining Material for Outer Pipe in Whole Body of Pipe.

Figure 1:
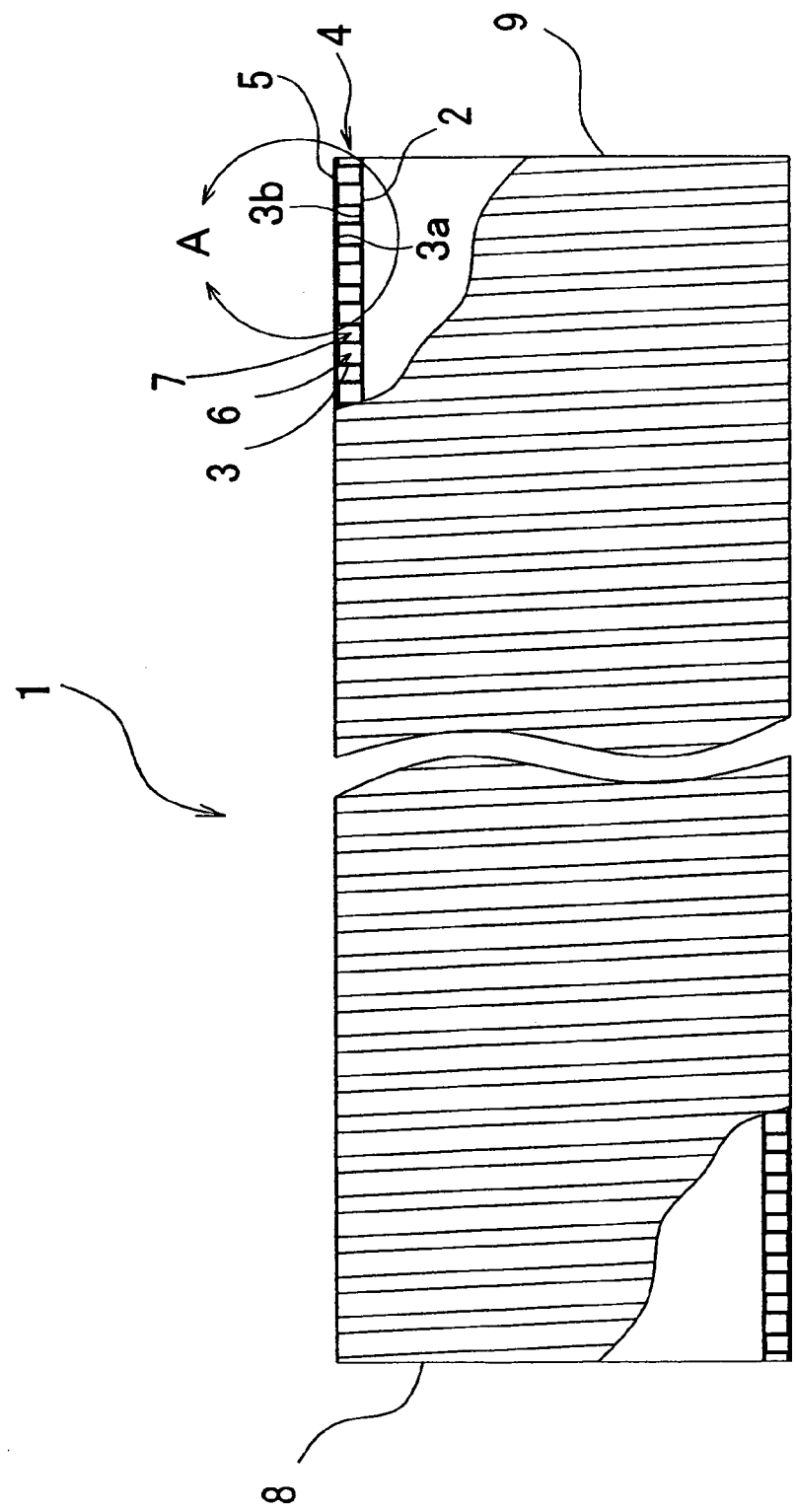
FIG. 1 is a partially broken side view of an entire structure of a synthetic resin pipe according to the present invention.

FIG. 1 is a view of an entire structure of a synthetic resin pipe according to the present invention, and illustrates a partially broken cross sectional view.

A synthetic resin pipe 1 includes an inner pipe 2 having a flat and smooth inner surface by rolling a belt-like synthetic resin. A spiral reinforcing part 4 is formed by forming a projected rim 3 in a spiral at a predetermined pitch in an outer body wall of the inner pipe 2. As a result, convex portions 3a and concave portions 3b are alternately formed along the pipe axis direction, on the outer surface of the inner pipe 2.

An outer pipe 5 is formed so as to bridge the convex portions 3a of the projected rim 3.

In the drawing, a reference numeral 6 represents a space enclosed by the projected rim 3 and the inner pipe 2, and a reference numeral 7 represents a space enclosed by the projected rim 3 and the outer pipe 5. A reference numeral 8 represents one end of the synthetic resin pipe 1 and a reference numeral 9 represents the other end of the synthetic resin pipe 1.

Figure 2:
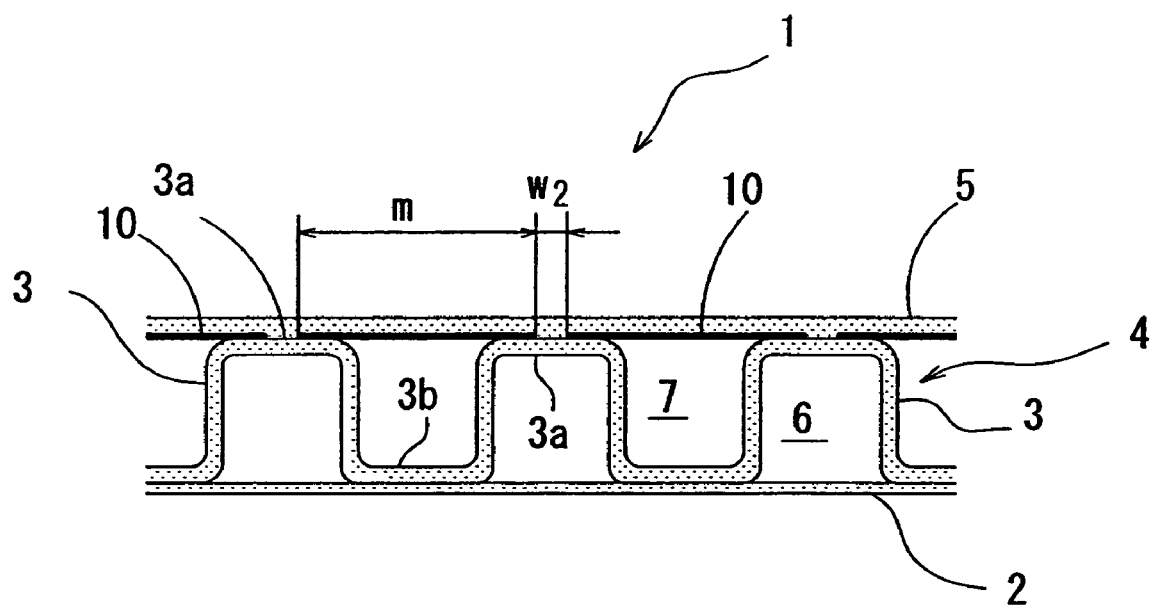
FIG. 2 is an enlarged sectional view of a portion in a circle A shown in FIG. 1.

FIG. 2 is an enlarged sectional view of a portion in a circle A shown in FIG. 1.

As shown in the drawing, the spiral reinforcing part 4 composed of the projected rim 3 is provided between the inner pipe 2 and the outer pipe 5. A shape retaining material for the outer pipe 10 made of a belt-like thin metal sheet is provided to an inner surface of the outer pipe 5 to maintain the flatness of an outer surface of the outer pipe 5 and to improve pressure-proof flatness strength.

In detail, the shape retaining material for the outer pipe 10 is wound spirally at a predetermined pitch, and a width "m" of an interval of the pitch is set to a length sufficient to bridge adjacent convex portions 3a.

The shape retaining material for the outer pipe 10 is also wound so that a predetermined interval $w_2$ from an adjacent shape retaining material for the outer pipe 10 is provided, and that the interval $w_2$ is positioned substantially at a center of the convex portions 3a, thereby fusing the convex portion 3a and the outer pipe 5 through the interval $w_2$.

In order to provide a sufficient strength to the outer pipe 5, a thin metal sheet made of such as iron or stainless steel may be used as a material of the shape retaining material for the outer pipe 10. While the thickness of the shape retaining material for the outer pipe 10 may vary depending on the selected material, it is usually sufficient with the thickness around 0.2 mm to 2.0 mm.

Figure 3:
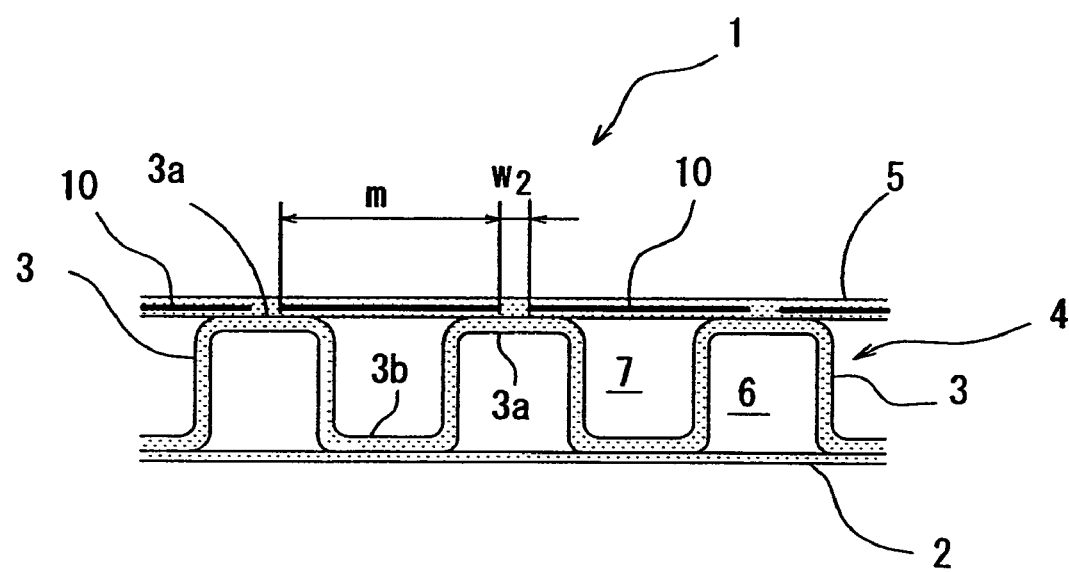
FIG. 3 shows a part corresponding to FIG. 2 of a synthetic resin pipe having a shape retaining material for an outer pipe buried in the outer pipe.

Further, in order to improve adhesiveness of the convex portion 3a and the outer pipe 5, as shown in FIG. 3, the surface of the shape retaining material for the outer pipe 10 may be covered with a material similar to (particularly, the same type of) the material used for the spiral reinforcing part 4.

The inner pipe including the above spiral reinforcing part 4 has the same structure as that of conventional corrugated pipes, and thus, it is possible to use the manufacturing facilities for the conventional corrugated pipe without modification.

Figure 18:
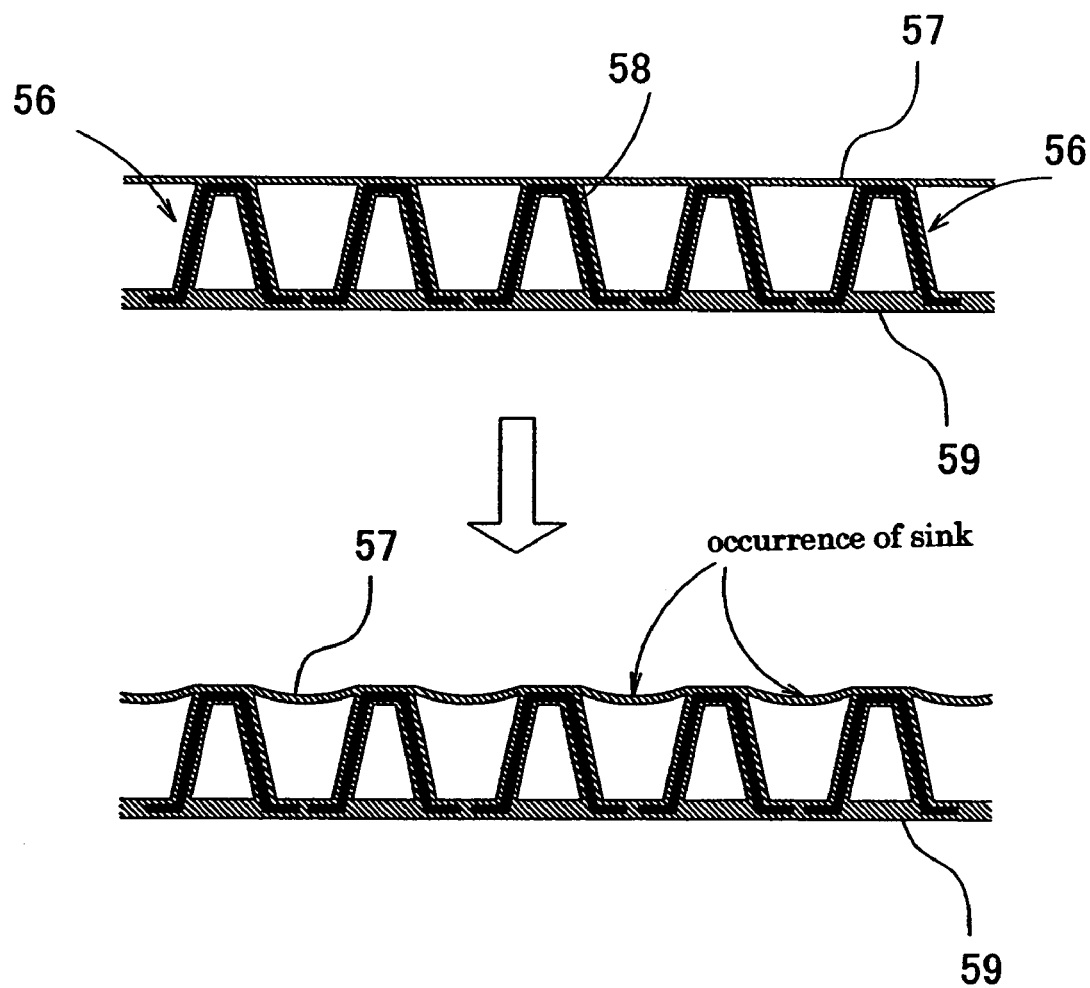
FIG. 18 is an explanatory view showing a condition of sinks caused during manufacturing process of a conventional synthetic resin pipe.

In the conventional corrugated pipe, as shown in FIG. 18, because a projected rim 56 is simply covered with a belt-like synthetic resin in a tube shape, a so-called "sink" is caused when the covering synthetic resin is hardened. As a result, an outer pipe 57 bends at the portion between adjacent projected rims 56 and the surface of the outer pipe 57 becomes uneven. In the drawing, a reference numeral 58 represents a reinforcing material that reinforces the projected rim 56 and a reference numeral 59 represents an inner pipe.

On the other hand, according to the synthetic resin pipe 1 of the present invention, as shown in FIGS. 2 and 3, the shape retaining material for the outer pipe 10 is provided to the outer pipe 5, and thus, an outer surface of the outer pipe 5 is kept flat without deformation even after the outer pipe 5 is hardened. Further, because the shape retaining material for the outer pipe 10 has the interval $w_2$ along the pipe axis direction, there is an advantage that the pressure-proof flatness strength can be improved without reducing the flexibility of the synthetic resin pipe 1.

In the above synthetic resin pipe 1, the shape retaining material for the outer pipe 10 is provided only for the inner surface of the outer pipe 5, and the original elasticity of the synthetic resin can be maintained in the spiral reinforcing part 4. As a result, when an external pressure on the synthetic resin pipe 1 is removed, the shape of cross section of the synthetic resin pipe 1 restores its original circular shape from an elliptical shape.

Examples of the synthetic resin used for the inner pipe 2, the spiral reinforcing part 4, and the outer pipe 5 include polyethylene, polyvinyl chloride, or polypropylene. Although it is preferable to use the same material of synthetic resin for all of the above parts in view of adhesiveness, the material for each part is not limited to the same type, and different synthetic resin materials may be used for the respective parts. When using different materials and the adhesiveness is not sufficient, an adhesion layer may be provided between the materials in order to improve adhesiveness.

A material for the adhesion layer is not particularly limited, and an adhesive resin such as high-density polyethylene may be used when the synthetic resin such as polyethylene, polyvinyl chloride, or polypropylene are used as the materials.

a-1 Modification of Projected rim

Figure 4:
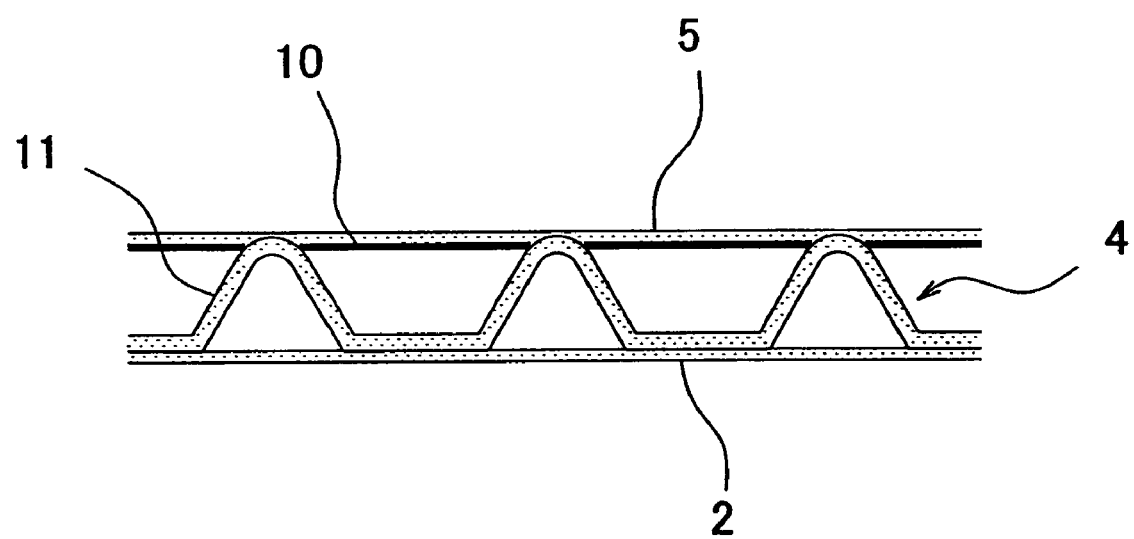
FIG. 4 shows a part corresponding to FIG. 2 with a modification of the spiral reinforcing part.

The shape of cross section of the projected rim 3 of the spiral reinforcing part 4 is not particularly limited, and may be a rectangular shape or a trapezoid shape in addition to the square shape as shown in FIG. 2. Further, a triangular shape shown in FIG. 4 or a semicircular shape for forming round waves (not shown in the drawing) may also be employed. In FIG. 4, a projected rim 11 having a triangular cross section is wound spirally to form a spiral reinforcing part 4.

a-2 Spiral reinforcing part Having Positioning Part

Figure 5:
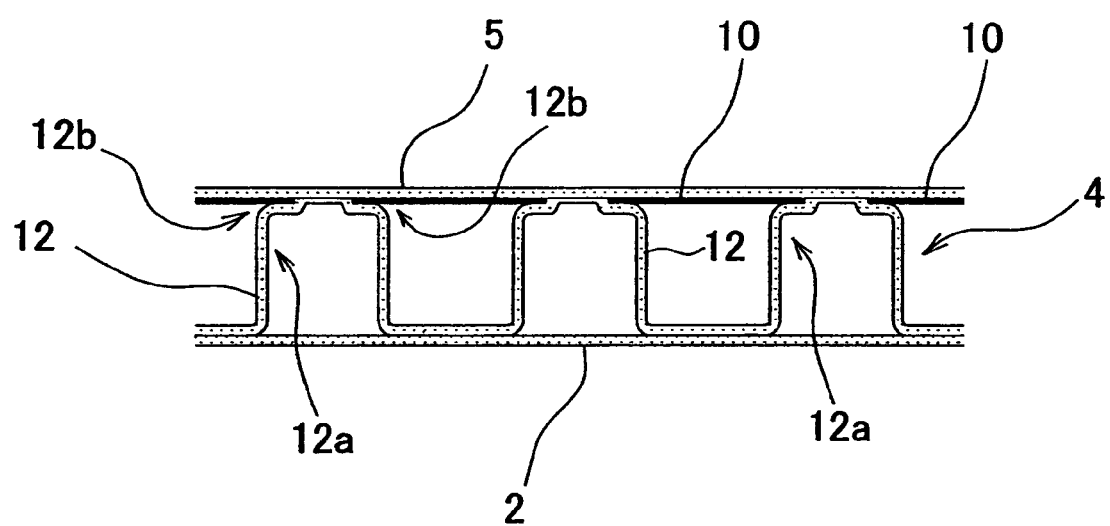
FIG. 5 shows a part corresponding to FIG. 2 with a spiral reinforcing part including a positioning part for the shape retaining material for the outer pipe.

FIG. 5 shows an example in which a positioning part is provided for correctly positioning the shape retaining material for the outer pipe 10 to a spiral reinforcing part 4.

In the drawing, a projected rim 12 of the spiral reinforcing part 4 includes step portions 12b and 12b depressed from the top of the convex portion 12a at outer corners of the convex portion 12a, respectively.

The step portions 12b and 12b may be positioning parts to position the shape retaining material for the outer pipe 10 when the shape retaining material for the outer pipe 10 is bridged adjacent convex portions 12a of the projected rim 12. Accordingly, misalignment of the shape retaining material for the outer pipe 10 during manufacturing processes may be suppressed, and it becomes possible to wind the shape retaining material for the outer pipe 10 with a high degree of accuracy.

In addition, only one step portion 12b may be formed as positioning part at one of the outer corners of the convex portion 12a.

Figure 6:
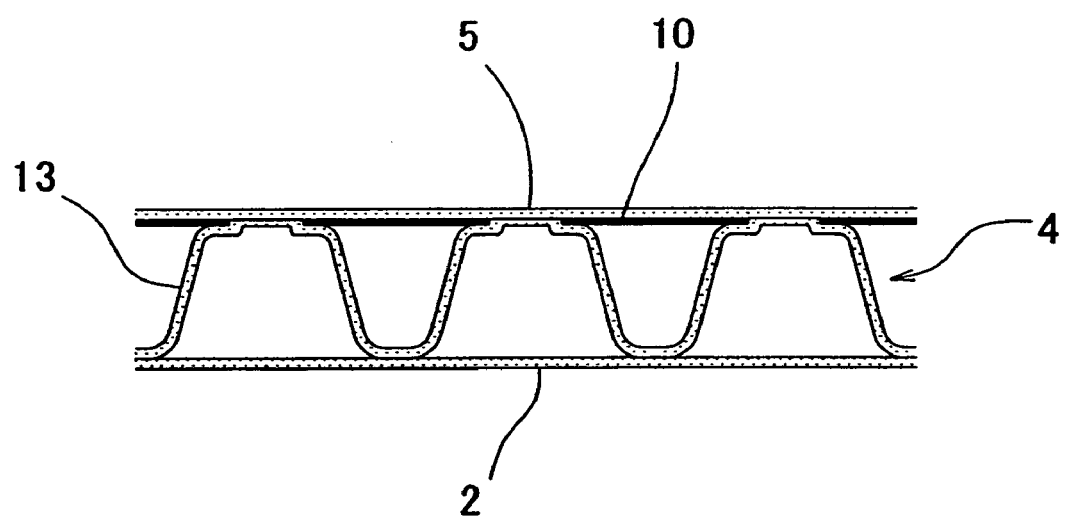
FIG. 6 shows a part corresponding to FIG. 2 with a modification of the spiral reinforcing part of FIG. 5.

Further, the shape of the spiral reinforcing part 4 is not limited to the square shape shown in FIG. 5, and a trapezoid shape in which the lower parts are spread toward the bottom, as shown in FIG. 6, may also be employed.

a-3 Method of Manufacturing Synthetic Resin Pipe

The synthetic resin pipe having the above structure may be manufactured in a manner as described below.

Firstly, the synthetic resin as the material for the inner pipe 2 is extruded and molded continuously in belt shape with an extrusion molding apparatus (not shown in the drawing), and provided in semi-molten state to a cylindrical molding roll (not shown in the drawing).

The extruded belt-like synthetic resin is rolled up so as to partially overlap with a back side edge of the synthetic resin which is rolled up previously, and then a cylindrical inner pipe 2 is formed by fusing the overlapped parts.

Then, the projected rim 3 is formed and fabricated using the belt-like synthetic resin in semi-molten state, wound around the outer body wall of the inner pipe 2, and fused to the outer surface of the inner pipe 2.

Next, a belt-like shape retaining material for the outer pipe is wound at an interval so as to bridge the adjacent convex portions 3a of the projected rim 3, and then a belt-like synthetic resin is wound around to form the outer pipe 5.

The method for forming the outer pipe 5 is not limited to the above method in which the belt-like synthetic resin is wound around, and a method such that a sheet material for the outer pipe 5 is manufactured in advance and the sheet is wound over the convex portion 3a of the projected rim 3 may also be used.

Note that, if the temperature of the belt-like or sheet of synthetic resin for the outer pipe to be wound around the outer surface and the spiral reinforcing part 4 is high when the outer pipe 5 is formed, heat shrinkage could occur in cooling process that results in a separation from the shape retaining material for the outer pipe 10.

In this case, the separation may be prevented by separately forming the belt-like or sheet of synthetic resin from the manufacturing process of the spiral reinforcing part 4, and by fusing the separately formed synthetic resin to the convex portion 3a of the projected rim 3 via an adhesion layer after cooling process.

Further, when the shape retaining material for the outer pipe 10 curved upward because of heat shrinkage in the pipe axis direction after the manufacturing process of the synthetic resin pipe 1, the outer surface of the synthetic resin pipe 1 may be formed straight by providing suppress strength from outside of the synthetic resin pipe 1 in the pipe axis direction.

Moreover, as shown in FIG. 3, in the structure in which the shape retaining material for the outer pipe 10 is buried in the outer pipe 5, a belt-like synthetic resin is formed while the shape retaining material for the outer pipe 10 is laid inside the outer pipe 5, and wound so that the belt-like synthetic resin is fuse to the convex portion 3a of the spiral reinforcing part 4. In this case, for the same reason as described the above, the adhesion layer may be provided between the convex portion 3a and the outer pipe 5 containing the shape retaining material for the outer pipe 10.

b Synthetic Resin Pipe Including Outer Pipe with Shape Retaining Material for the Outer Pipe only in End Portions In the above embodiment, an example of the synthetic resin pipe 1 having the outer pipe 5 retained with the shape retaining material for the outer pipe 10 that is provided over the entire pipe is described. However, because, the synthetic resin pipe 1 according to the present invention can improve water-stop performance when connecting with another synthetic resin pipe using a joint in comparison with the conventional pipes, as well as workability because caulking filling operation is not required, the synthetic resin pipe 1 according to the present invention may include an outer pipe 24 retained with the shape retaining material for the outer pipe 10 that is provided only at both end portions of the synthetic resin pipe, as shown in FIG. 7.

Figure 7:
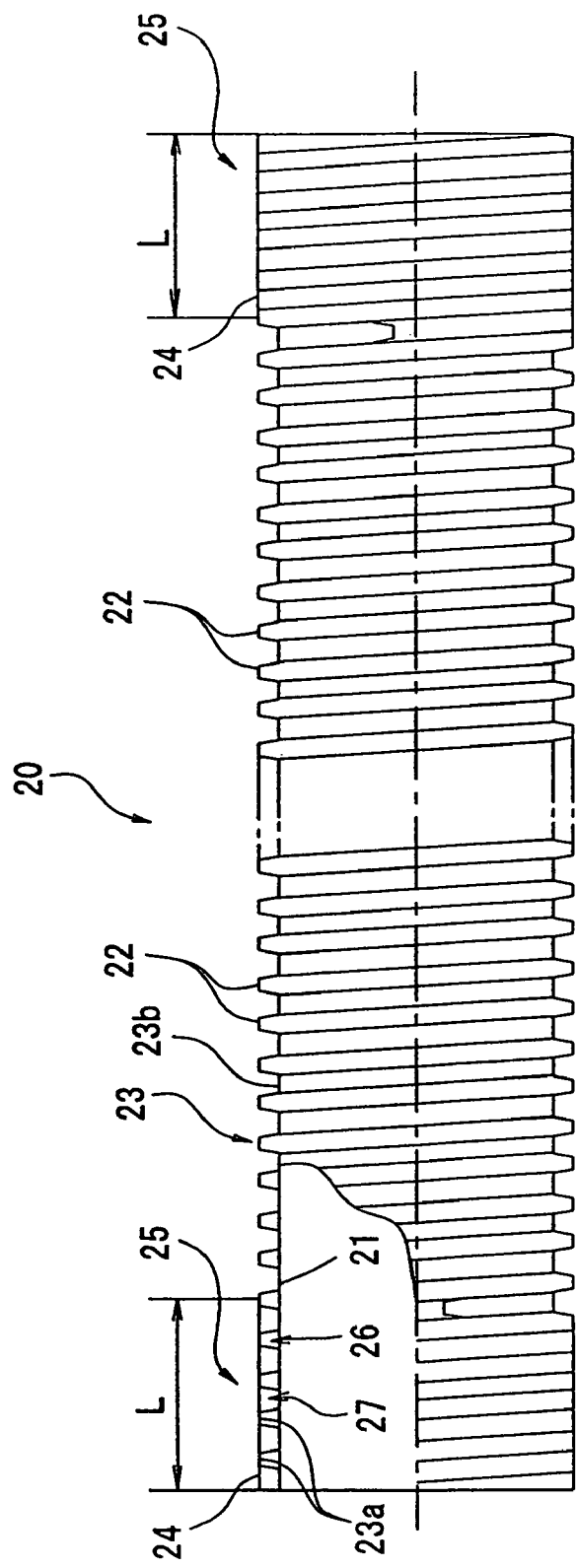
FIG. 7 is a side view of a synthetic resin pipe including the outer pipe having the shape retaining material for the outer pipe only at both ends of the pipe.

As shown in FIG. 7, a synthetic resin pipe 20 includes an inner pipe 21 having a flat and smooth inner surface. A spiral reinforcing part 23 is formed by forming a projected rim 22 in a spiral at a predetermined pitch in an outer body wall of the inner pipe 21. The spiral reinforcing part 23 is composed of convex portions 23a and concave portions 23b are alternately formed along the pipe axis direction.

The belt-like synthetic resin is wound so as to bridge the convex portions 23a of the projected rim 22 at the end portions of the synthetic resin pipe 20, and thereby forming the outer pipe 24.

The outer surface of the outer pipe 24 is retained with a shape retaining material for the outer pipe 10 (no shown) to be flat. The retained outer pipe 24 is provided at both ends of the synthetic resin pipe 20, that is, at outer pipe forming portions 25 that are designated by "L" in right and left side ends in the drawing.

In the outer pipe forming unit 25, a reference numeral 26 represents a projected rim space enclosed by the projected rim 22, and a reference numeral 27 represents a concave side space which is enclosed by the concave portion 23b, the outer pipe 24 and the inner pipe 21.

In FIG. 7, the structure of the synthetic resin pipe 20 in which the outer pipe forming portions 25 are provided at both ends of the synthetic resin pipe 20 is shown. However, when a long multiunit pipe 20 with bore diameter of 1000 mm is manufactured, for example, it is possible to provide a plurality of outer pipe forming portions 25 (e.g. 1 m long) at a predetermined interval (e.g. 5 m). In this case, if the synthetic resin pipe 20 is cut along its diameter at the center in the pipe axis direction at any of the outer pipe forming portions 25, the cut portion having a flat outer surface can be used as a connecting part.

c Junction Structure of Synthetic Resin Pipe

A synthetic resin pipe 1 having the above structure can be connected using a socket-type joint or a holding-type joint. When the bore diameter of the synthetic resin pipe 1 is comparatively small (e.g. the external diameter is equal to or smaller than 300 mm), a socket-type joint can be used for connecting. When the bore diameter is large (e.g. the external diameter is greater than 300 mm), a holding-type joint can be used for connecting.

c-1 Socket-Type Joint

Figure 8:
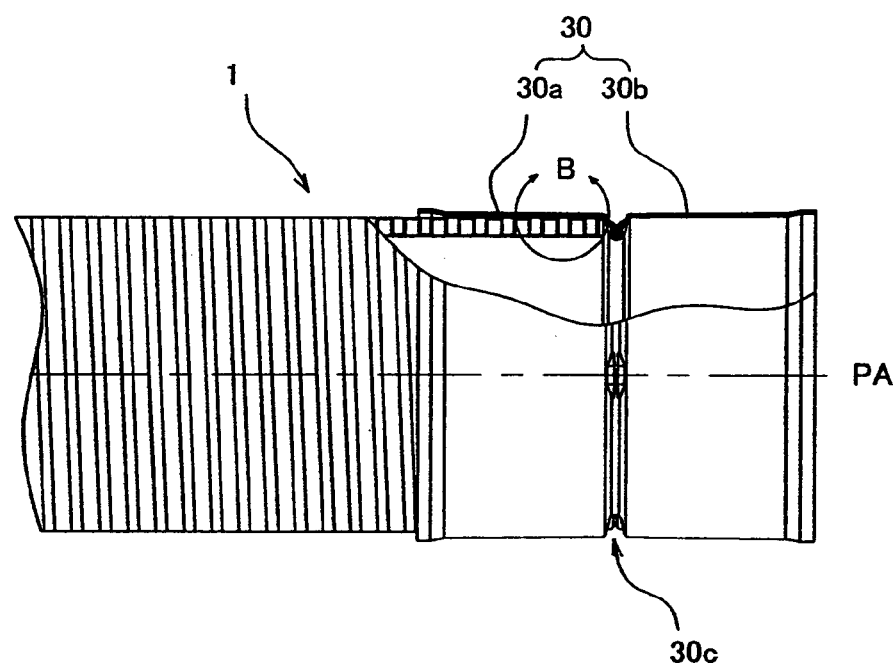
FIG. 8 is a partially broken side view showing a connecting condition of the synthetic resin pipe.

FIG. 8 shows a structure for connecting synthetic resin pipes using a socket-type joint 30. A connecting end of one of the synthetic resin pipes 1 is inserted into a connecting opening 30a of the joint 30 made of synthetic resin, and a connecting end of another of the synthetic resin pipes 1, which is not shown in the drawing, is inserted into a connecting opening 30b on the other side of the joint 30.

A U-shaped groove portion 30c is provided in circumferential direction at a central portion in the pipe axis direction of the joint 30. The depth of the groove potion 30c is set as approximately the same as the thickness of the synthetic resin pipe 1 on both sides (only the synthetic resin pipe 1 on the left side is shown in FIG. 8), so that an inner surface of the synthetic resin pipe 1 and an inner surface of the junction 30 are on the same plane. Further, the groove portion 30c functions as a positioning part when the synthetic resin pipe 1 is inserted, and is configured to cover the connecting side of the synthetic resin pipe 1 when the insertion is completed.

Figure 9:
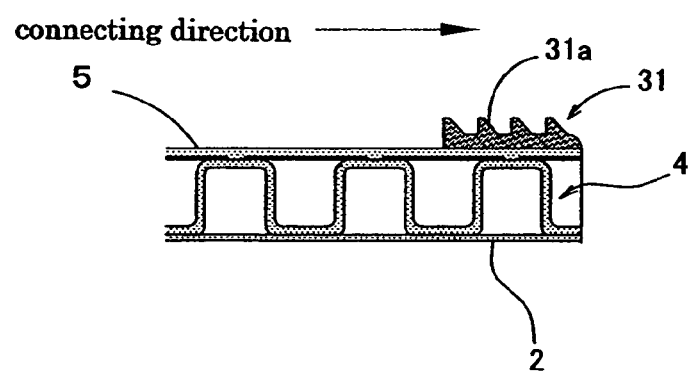
FIG. 9 is an enlarged sectional view of a main part of a buffer material provided to a corrugated end.

FIG. 9 shows an enlarged view of a portion in a circle B shown in FIG. 8.

In the drawing, a buffer material 31 made of synthetic rubber in tube shape is provided on the outer body wall of the connecting end of the outer pipe 5. A plurality of wedged projected rims 31a facing a connecting direction are provided on the buffer material. The synthetic resin pipe 1 can be easily inserted in the connecting direction, but the wedged projected rims 31a function as resistance to prevent disengagement when the synthetic resin pipe 1 can be easily inserted in the opposite direction.

Figure 19:
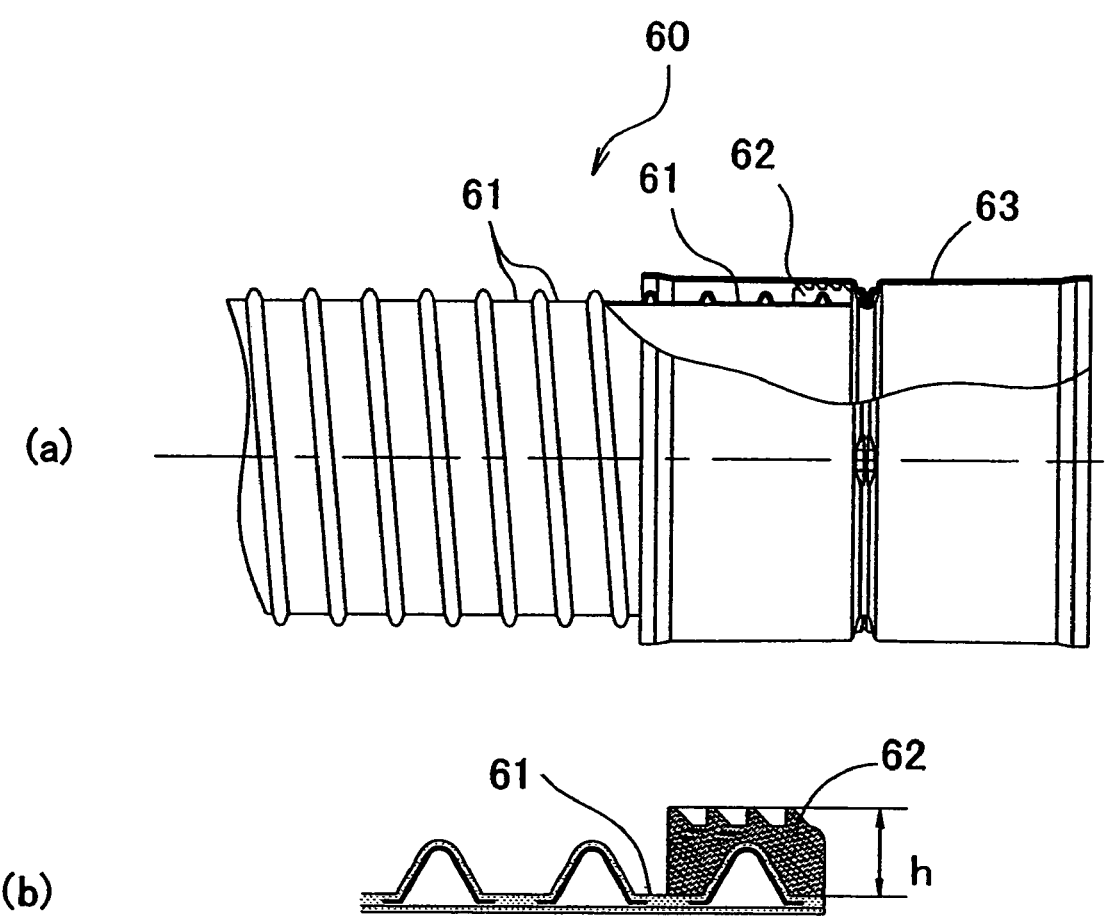
FIGS. 19A and 19B are a partially broken side view showing a connecting condition of the conventional synthetic resin pipe, and an enlarged view showing a connecting end of the conventional synthetic resin pipe, respectively.

In the synthetic resin pipe 1 of the present invention, since the outer body wall of the outer pipe 5 is flat, there is no concave portion 61 like in the case of a conventional corrugated pipe 60 (See FIG. 19A).

Although a water-stop block or a water-stop caulking material 62 having a height "h" is required for filling the space of the concave portion 61 and maintain the water-stop performance at the same time (See FIG. 19B.) in the conventional corrugated pipe 60, such a water-stop block or a water-stop caulking material is not required in according to the synthetic resin pipe 1 of the present invention. Adhesiveness between the outer pipe 5 and the joint 30 can be improved only with the thin buffer material 31, and stable water-stop performance can be obtained. In FIG. 19A, a reference numeral 63 represents the socket-type joint.

In FIG. 9, the buffer material 31 is not limited to the above synthetic rubber, and water-distensible sealing material which is mainly made of synthetic rubber and nonwoven cloth may also be used. In a case in which the water-distensible sealing material is employed as the buffer material 31, the buffer distends when water comes, thereby improving the adhesiveness between the outer pipe 5 and the joint 30. Thus, liquid-tightness and leakage prevention are also improved.

Figure 10:
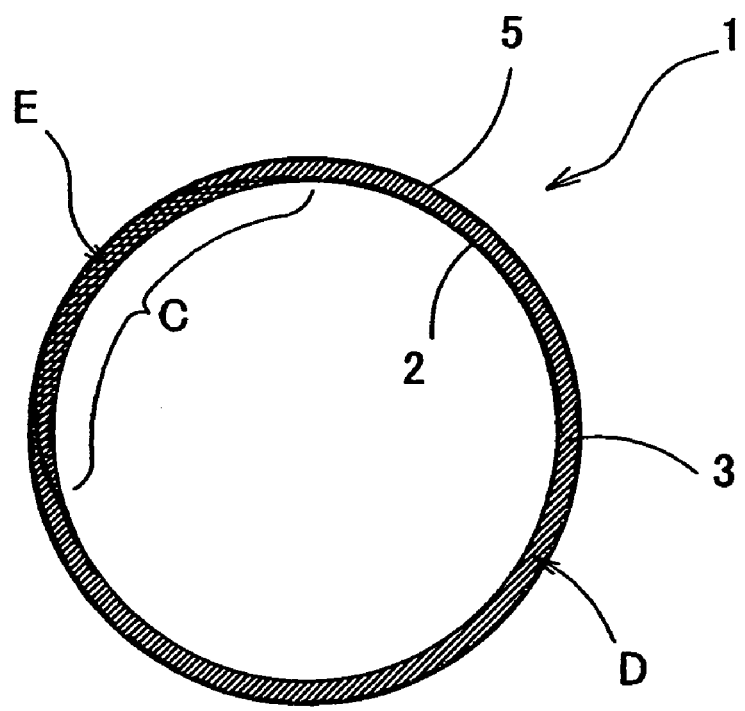
FIG. 10 is an end view showing an end of the synthetic resin pipe on a connecting side.

FIG. 10 is a sectional view, cutting the connecting end of the synthetic resin pipe 1 in a direction perpendicular to the pipe axis PA (See FIG. 8.). At a side face of the synthetic resin pipe 1, side faces of the inner pipe 2 and the outer pipe 5, respectively, are shown concentrically. Between the inner pipe 2 and the outer pipe 5, an annular groove potion D is shown except for a region C.

The region C represents a cutting surface of the projected rim 3 and the groove portion D represents the concave portion 3b of the projected rim 3. The groove portion D is a path which is spirally communicating between two ends of the synthetic resin pipe 1. Further, a reference E in the region C is a path which is spirally communicating, inside the projected rim 3, between two ends of the synthetic resin pipe 1.

Figure 11:
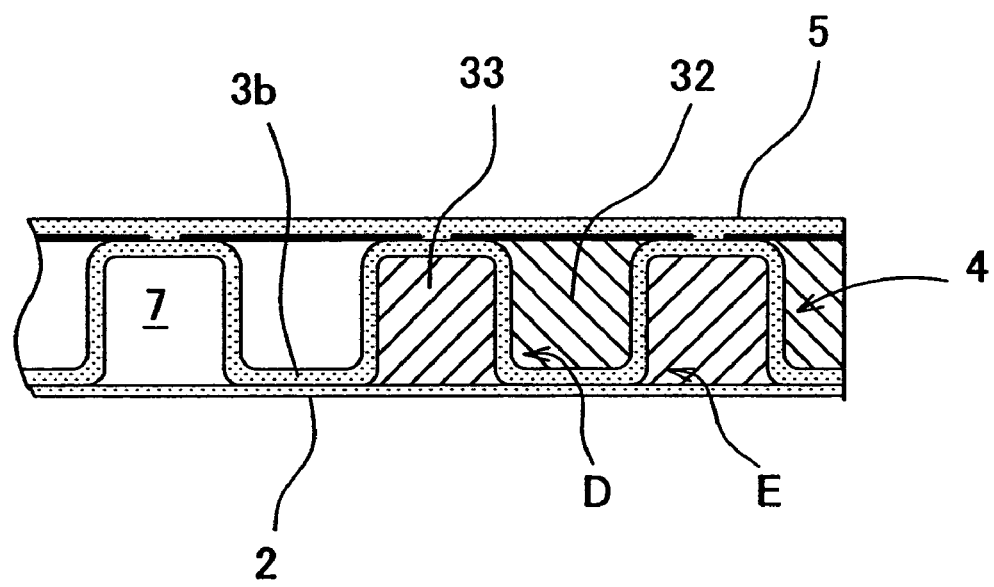
FIG. 11 is a side sectional view showing a structure for water-stop at the end on the connecting side.

The groove portion D and the path E respectively through the concave portion 3a and projected rim 3 form water lines, and are occluded with a stopper for stopping water, as shown in FIG. 11.

c-2 Stopper for Stopping Water

When a long solid-core filling material made of thermoplastic resin or thermosetting resin is used as the above stopper for stopping water, a sectional shape of a stopper 32 inserted into the groove portion D is formed in order to conform to the shape of a sectional shape of the concave portion 3b and a sectional shape of a stopper 33 inserted into the path E is formed in order to conform to the shape of a sectional shape of the space enclosed by the projected rim 3.

The stoppers 32 and 33 can stop block off the water lines of the groove portion D and the path E, when inserted to a depth of more than ⅛ of the outer circumference of the synthetic resin pipe 1.

The stoppers 32 and 33 may be inserted by being rolled up at the same time when the synthetic resin pipe 1 is manufactured, or may be inserted in another process after the synthetic resin pipe 1 is formed.

Further, when foaming resin such as urethane foam is used as the stoppers, foaming resin component which is not yet foaming (e.g. a mixture of two liquids such as polyol and isocyanate) is injected into a part of the groove portion D and the path E using a filling apparatus (not shown). Then the component is formed in the groove portion D and the path E so that the groove portion D and the path E are partially blocked.

The foaming resin component is not especially limited, if the material forms closed cells. However, it is preferable that the material has high water resistance to maintain the liquid-tightness and a predetermined strength to counter water presser (e.g. core density of the foaming material is equal to or more than 50 kg/m$^3$).

The above foamed resin may be used as a form (resin form) for foam resin to be injected next for stopping water. Further, when foaming, a form is provided to the end face of the synthetic resin pipe 1, a mesh glass cloth is provided on the inner side of the form, and the glass cloth is impregnated to the foaming resin, thereby making a surface skin layer of the foaming resin FRP structure to improve the strength.

When an inorganic filling material, concretely, mortar is used to form the stoppers, mortar obtained by blending portland cement, aggregate, and water is injected to the groove portion D and the path E and hardened, thereby adding the strength of the mortar to the strength of the synthetic resin pipe 1 itself. With this, it is possible to further improve the pressure-proof flatness strength of the synthetic resin pipe 1.

In order to improve the tensile strength of the mortar, polymer such as a cement subordinate material can be added to the above mortar. Further, in order to reduce the weight of the stoppers, comparatively light material such as styrene resin grain or burned perlite may be used as aggregate and distributed into cement evenly using dispersing agent.

Figure 12:
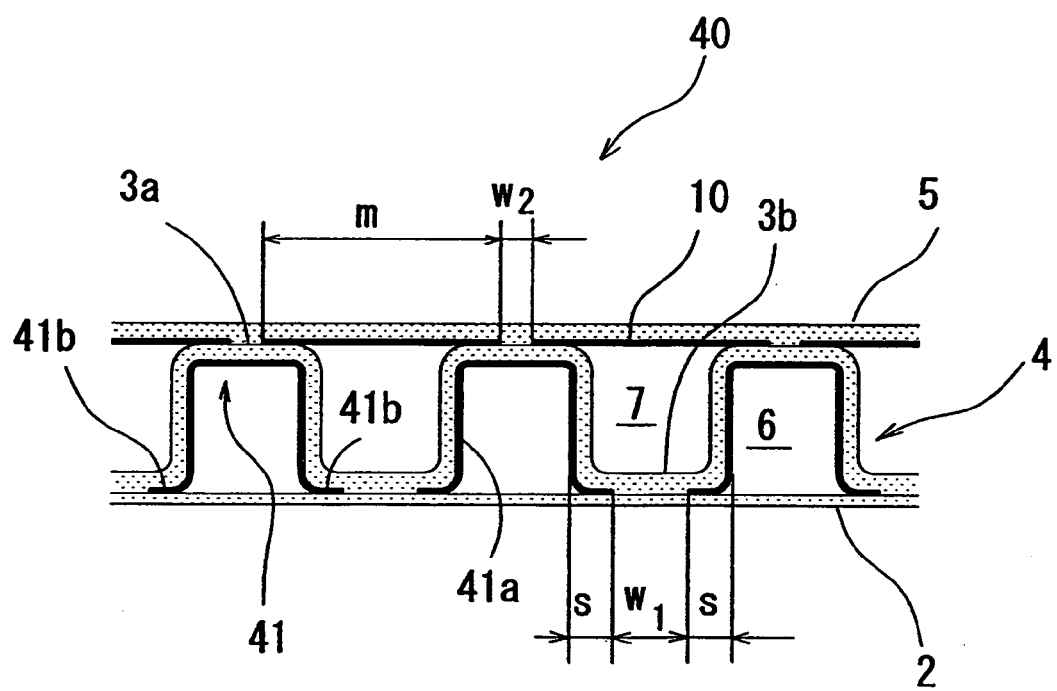
FIG. 12 shows a part corresponding to FIG. 2 of a spiral reinforcing part having a reinforcing material.

The above insertion of the stoppers is performed as a water-stop process of the pipe edges during the manufacturing of the synthetic resin pipe 1 in a factory.

d Synthetic Resin Pipe Having Spiral Reinforcing Part Having Reinforcing Material A synthetic resin pipe 40 shown in FIG. 12 has a structure in which a reinforcing material 41 is added to the spiral reinforcing part 4 of the synthetic resin pipe 1 in FIG. 2.

In the following explanation, the same reference numbers are used for the same components as shown in FIG. 2 and those components are not explained here.

As shown in FIG. 12, the synthetic resin pipe 40 includes the reinforcing material 41 provided in the inner surface of the spiral reinforcing part 4. The reinforcing material 41 is composed of a material which is made by processing a thin copper sheet into a belt-like state and then forming it into a convex form. The reinforcing material 41 includes a convex portion 41a which is projecting toward the outer circumference direction in a state of being wound around the outer body wall of the inner pipe 2. A pair of leg parts 41b and 41b are provided at a hem of the convex portions 41a.

The leg parts 41b and 41b are bended to opposite sides from each other in the pipe axis direction. A length "s" of each leg part 41b is set so as to maintain an interval $w_1$ from the leg part 41b and an adjacent projected rim 3.

By this, when the projected rim 3 is wound around the outer body wall of the inner pipe 2, the concave portion 3b and the inner pipe 2 are fused through the interval $w_1$.

The synthetic resin pipe 40 having above structure can be manufactured as follows.

The inner pipe 2 is extruded and molded continuously in a belt shape with an extrusion molding equipment which is not shown in the drawing, and provided in semi-molten state to a cylindrical molding roll which is not shown in the drawing.

The molding roll is composed of a plurality of roll pieces arranged inclined toward the cylindrical axis. The extruded belt-like synthetic resin is rolled up by the roll pieces so that the synthetic resin overlaps with a backside edge of the synthetic resin which is rolled up previously. A cylindrical shape is formed by fusing the overlapped parts.

The reinforcing material 41 is wound around the outer body wall of the inner pipe 2 made in the above manner, so as to further reinforce the spiral reinforcing part 4. The belt-like synthetic resin for forming the projected rim 3 is wound around the outer surface of the reinforcing material 41, thereby forming the spiral reinforcing part 4.

Then the shape retaining material for the outer pipe 10 is wound so as to bridge the convex portions 3a of the projected rim 3 of the spiral reinforcing part 4. A belt-like synthetic resin is wound around the outside of the shape retaining material for the outer pipe 10, thereby forming the outer pipe 5.

Figure 13:
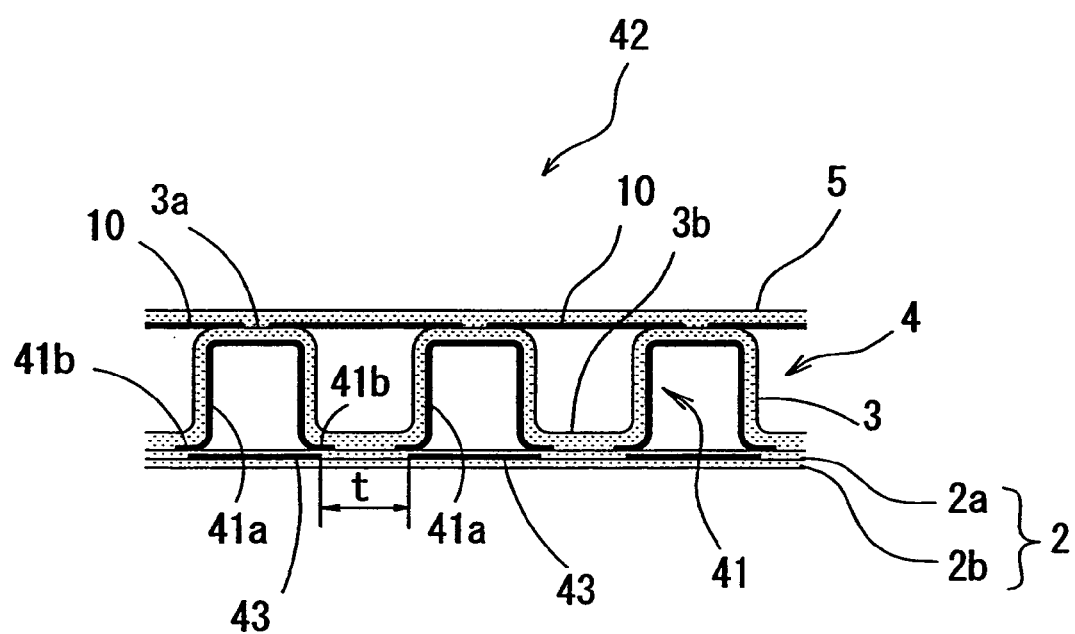
FIG. 13 shows a part corresponding to FIG. 2 of an inner pipe having a shape retaining material for the inner pipe.

According to the synthetic resin pipe 40 having the above structure, the spiral reinforcing part 4 is reinforced by the reinforcing material 41, and the outer pipe 5 is retained by the shape retaining material for the outer pipe 10. Thus, the pressure-proof flatness strength can be further improved compared to the synthetic resin pipe 1 shown in FIG. 2.

d-1 Synthetic Resin Pipe Having Inner Pipe Having Shape Retaining Material for Inner Pipe The synthetic resin pipe 42 shown in FIG. 13 has a structure in which the inner pipe 2 consists of a double layer structure of two layers 2a and 2b and shape retaining material for the inner pipes 43 are buried between the layers.

The shape retaining material for the inner pipes 43 are made of a belt-like metal sheet and arranged so as to straddle the leg parts 41b and 41b of the reinforcing material 41 of the spiral reinforcing part 4.

Further, an interval t is provided between the shape retaining material for the inner pipes 43, and the two layers 2a and 2b of the inner pipe 2 are fused through the interval t to be integrated.

According to the synthetic resin pipe 42 having the above structure, the outer surface of the outer pipe 5 is formed flat and the inner surface of the inner pipe 2 is also formed flat. Accordingly, it is possible to withstand pressure from inside or outside and the pressure-proof flatness strength can be further improved.

d-2 Modification of Spiral Reinforcing Part Having Reinforcing Material

Figure 14:
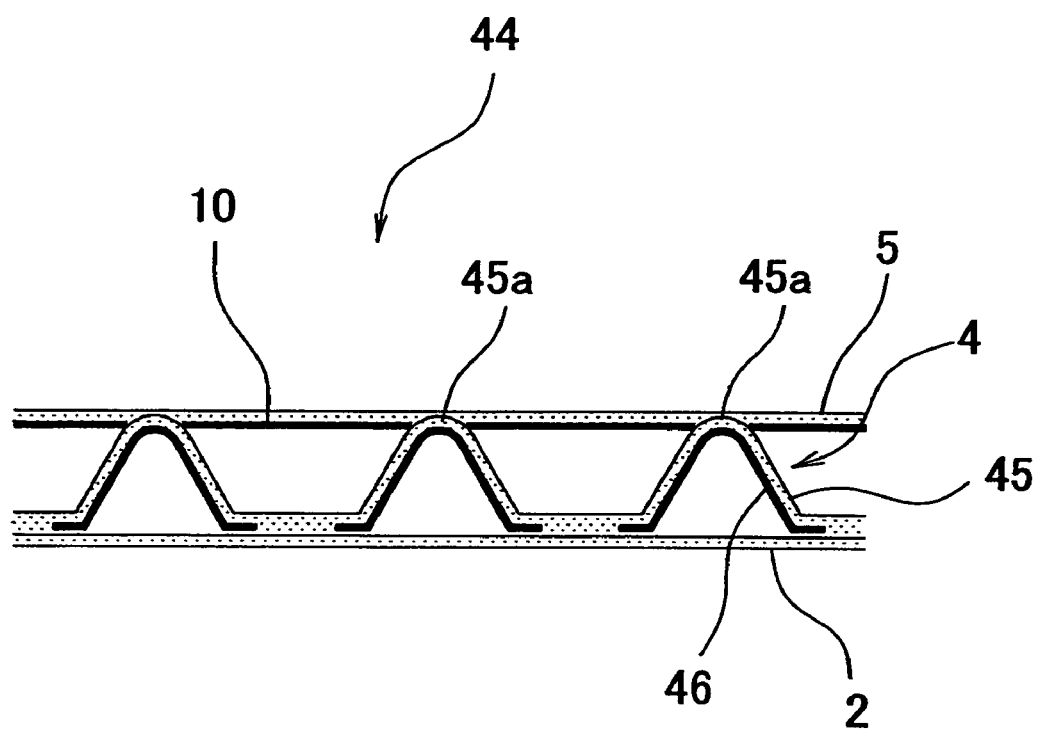
FIG. 14 shows a part corresponding to FIG. 2 of a modification of the spiral reinforcing part.

A synthetic resin pipe 44 shown in FIG. 14 has a structure in which projected rims 45 of the spiral reinforcing part 4 provided between the inner pipe 2 and the outer pipe 5 are curved in triangular shape.

In such a structure, reinforcing materials 46 are provided inside the projected rims 45, respectively. The reinforcing material 46 is made by forming a thin cupper sheet so as to have an inverted V-shape cross section, and retains the sectional shape of the projected rim 45 in a triangular shape. The shape retaining material for the outer pipe 10 is provided inside the outer pipe 5 so as to bridge the convex portions 45a of the projected rim 45.

d-3 Reinforcing Material Having Positioning Part

Figure 15:
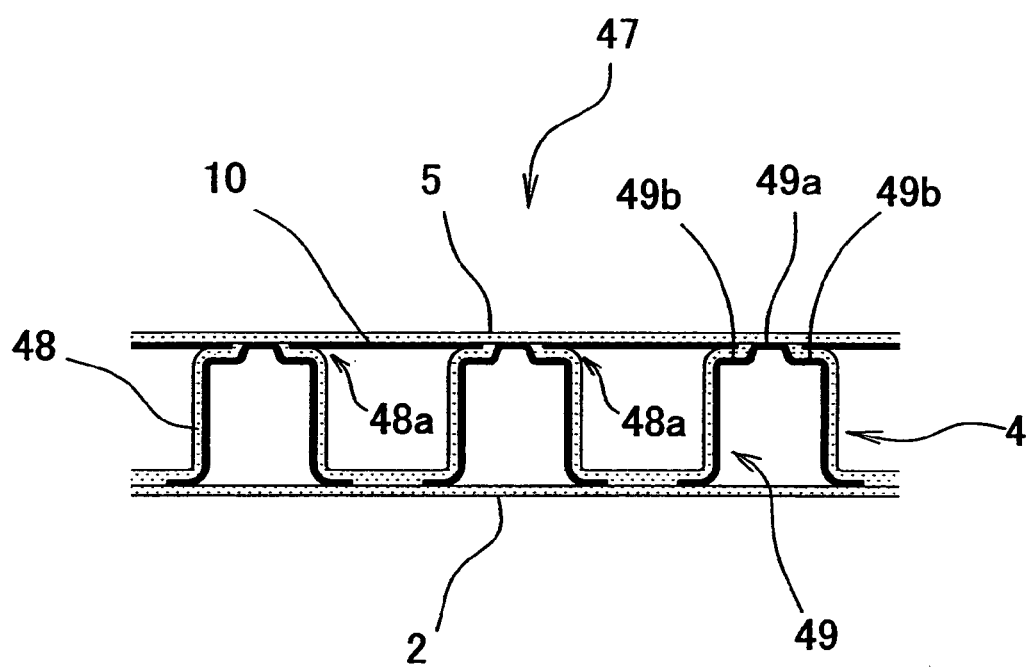
FIG. 15 shows a part corresponding to FIG. 2 of a spiral reinforcing part having a positioning part of the shape retaining material for the outer pipe.

A synthetic resin pipe 47 shown in FIG. 15 has a structure in which a reinforcing material 49 is provided inside a square corrugated projected rim 48, and step portions (positioning parts) 49b are provided at both sides of an upper surface 49a of the reinforcing material 49.

The step portions 49b are depressed from the top of the convex portion 49a, and an edge in the pipe axis direction of the shape retaining material for the outer pipe 10 is arranged to correspond to each step portion 49b. By this, when the shape retaining material for the outer pipe 10 is provided so as to straddle the convex portions 48a of the projected rim 48, the shape retaining material for the outer pipe 10 can be positioned accurately at a predetermined position of the projected rim 48 (the step portion 49b). As a result, the synthetic resin pipe 47 having a flat outer surface can be manufactured with high accuracy.

Figure 16:
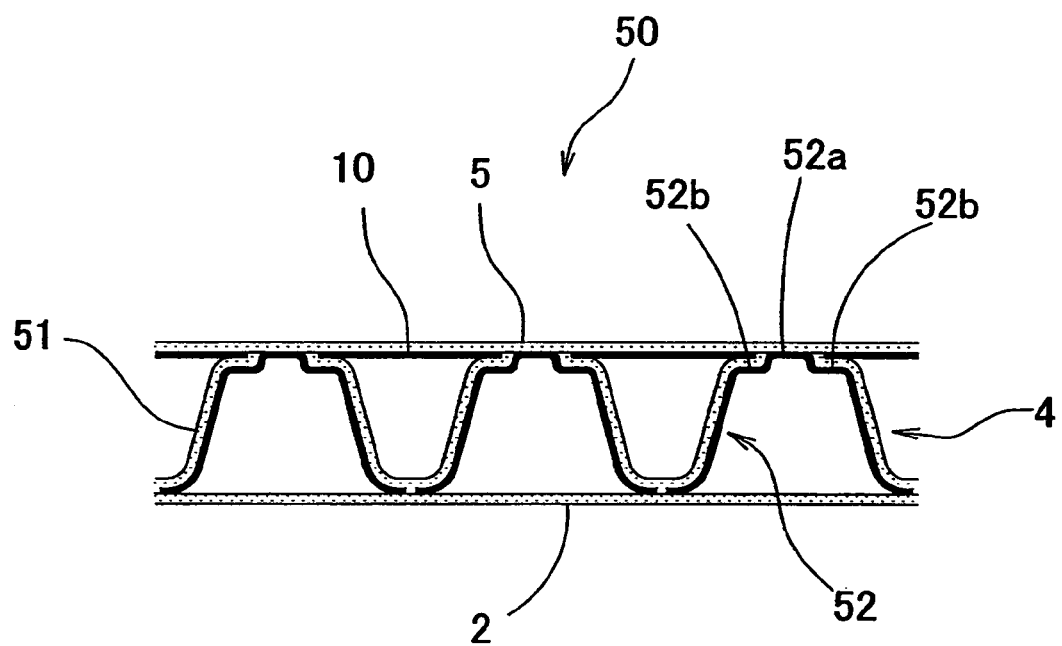
FIG. 16 shows a part corresponding to FIG. 2 of a modification of the spiral reinforcing part of FIG. 15.

A synthetic resin pipe 50 shown in FIG. 16 has a structure in which a projected rim 51 is formed in trapezoidal shape.

A reinforcing material 52 which is formed in a trapezoidal shape is provided in the projected rim 51, and step portions 52b, 52b are provided on both sides of an upper surface 52a of the reinforcing material 52.

Each step portion 52b is depressed from the top of the convex portion 52a. An edge in the pipe axis direction of the shape retaining material for the outer pipe 10 is arranged to correspond to each step portion 52b.

Here, the step portions 49b and 52b respectively shown in FIGS. 15 and 16 are preferably provided on the both sides in the pipe axis direction of the outer circumference of the projected rim 48 (51). However, the effect of excellent positioning performance can be obtained if the step portion 49b (52b) is formed at least one side of the shape retaining material for the outer pipe 10.

d-4 Modification of Reinforcing Material

Figure 17:
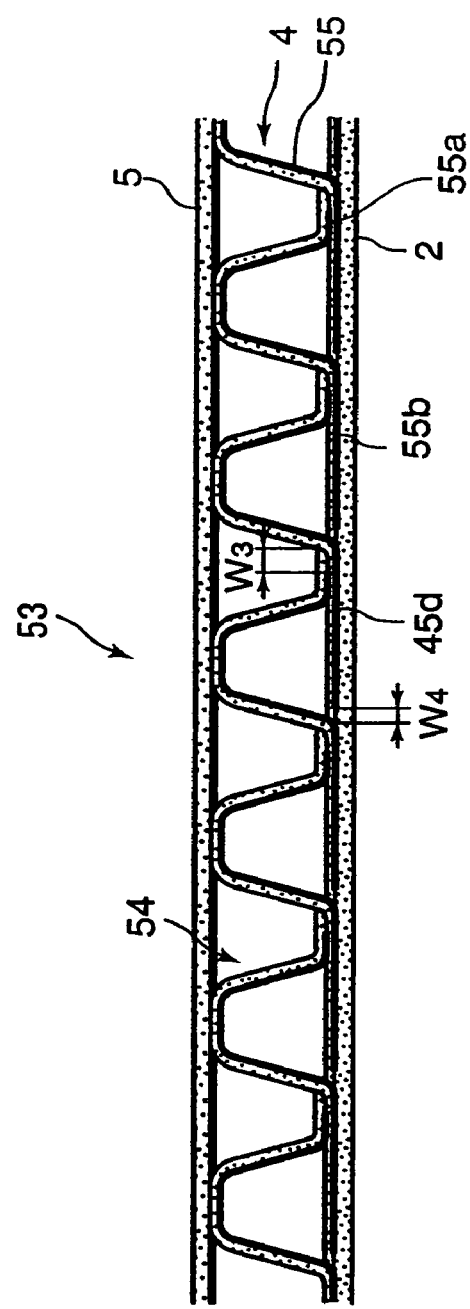
FIG. 17 is a side sectional view showing a modification of the reinforcing material provided to the spiral reinforcing part.

A synthetic resin pipe 53 shown in FIG. 17 has a structure in which a metal sheet of reinforcing material 55 reinforces the inside of a projected rim 54, and two reinforcing material leg parts 55a and 55b are formed at a hem of the reinforcing material 55. The leg parts 55a and 55b are bended approximately parallel in the pipe axis direction and the lengths of the reinforcing material leg parts 55a and 55b are not the same.

In detail, in the drawing, the right reinforcing material leg part 55a is formed to be about a half length of the concave width between the leg part 55a and an adjacent projected rim 54, and the left reinforcing material leg part 55b extends toward the adjacent projected rim 54 so that the length is approximately the same as the pitch of the wound of the projected rim 54.

Therefore, as the projected rim 54 is wound around the outer body wall of the inner pipe 2, the reinforcing material leg part 55a of the projected rim 54 that is currently wound around overlaps with the reinforcing material leg part 54b of the projected rim 54 that has been wound around previously.

With such structure, the inner pipe 2 may be reinforced by providing spiral reinforcing part 4 and the strength and inner flatness can be improved without providing the shape retaining material for the inner pipe 43 which is made of a different material, as shown in FIG. 13.

Since an interval $w_3$ is secured between the reinforcing material leg part 55a and an adjacent projected rim 54, the resin of projected rims 54 are fused to be integrated. Further, since an interval $w_4$ is secured to the end portion of the reinforcing material leg part 54b, the resin of the inner pipe 2 and the projected rims 54 are also fused to be integrated.

According to the synthetic resin pipe 53 having the above structure, the outer surface of the outer pipe 5 is formed flat, and the inner surface of the inner pipe 2 is also formed flat. Further, it is possible to further improve the pressure-proof flatness strength so as to withstand the pressure from inside or outside.

According to each of the synthetic resin pipes having the above structures, the outside surface of the outer pipe can be made flat. Thus, in case that synthetic resin pipes are connected each other using a halved junction, it is possible to improve the water-tightness of the connecting portion of the pipes by winding butyl rubber sheet, for example, for a predetermined width at a butt joint of the synthetic resin pipes, and by fitting the halved junction over the butyl rubber sheet, because no space is left between the halved junction and the outer pipe.

Specifically, in the conventional corrugate pipe of φ600 mm including an outer surface in a concavo-convex waved form, water leak starts at an internal pressure around 0.02 MPa to 0.05 MPa even with the water-stop process by filling caulking material in the concave portion of the waveform. In contrast, the synthetic resin pipes of φ600 mm according to the present invention, which are arranged so as to face each other and connected to each other using the halved junction, withstand an internal pressure up to 0.35 Mpa without leaking water.

As described above, according to the synthetic resin pipe of the present invention, it is possible to improve the water-stop performance as well as workability since the filling of the caulking material is not required.

Furthermore, the above described structures of FIGS. 12 to 17 may be provided only for the connecting end of the pipe as in the case of the synthetic resin pipe shown in FIG. 7.

What is claimed is:

1. A synthetic resin pipe, comprising:
   an inner pipe formed by spirally winding a belt-like synthetic resin;
   a spiral reinforcing part formed by spirally winding a synthetic resin having a projected rim with convex portions projecting outside;

an outer pipe of belt-like synthetic resin provided so as to connect a part or all of the convex portions arranged in a pipe axis direction; and a shape retaining material for the outer pipe made of a belt-like metal sheet for retaining a shape of the outer pipe flat and buried in or provide to an inner surface of the outer pipe;

wherein the shape retaining material for the outer pipe is a synthetic resin pipe wound around the convex portions of the projected rim at predetermined intervals and connecting the convex portions of the projected rim.

2. The synthetic resin pipe according to claim 1, wherein the outer pipe retained to be flat by the shape retaining material for the outer pipe is provided to both ends of the inner pipe around which the spiral reinforcing part is wound.

3. The synthetic resin pipe according to claim 2, wherein a reinforcing material made of metal sheet is provided to the spiral reinforcing part along the projected rim.

4. The synthetic resin pipe according to claim 1, wherein a reinforcing material made of metal sheet is provided to the spiral reinforcing part along the projected rim.

5. The synthetic resin pipe according to claim 4, wherein a step portion for positioning each end in the pipe axis direction of the shape retaining material for the outer pipe is provided to a top portion of the projected rim.

6. The synthetic resin pipe according to claim 4, wherein the reinforcing material includes a pair of leg parts in an inner circumference thereof, and one of the leg parts is bent toward the pipe axis direction and extending toward an adjacent projected rim along an outer body wall of the inner pipe to retain a shape of the inner pipe to be flat.

7. The synthetic resin pipe according to claim 4, wherein a shape retaining material for the inner pipe of a metal sheet for retaining the inner pipe flat is buried in the inner pipe so as to correspond to the reinforcing material.

8. The synthetic resin pipe according to claim 7, wherein the reinforcing material includes a pair of leg parts in an inner circumference thereof, and the shape retaining material for the inner pipe is arranged to connect the leg parts in the pipe axis direction.

9. The synthetic resin pipe according to claim 1, wherein a fusing portion of the outer pipe and the spiral reinforcing part is formed at the predetermined interval through the shape retaining material for the outer pipe.

* * * * *